United States Patent
Palladino et al.

(10) Patent No.: US 12,252,312 B2
(45) Date of Patent: *Mar. 18, 2025

(54) LID-SPOUT ASSEMBLY FOR A PACKAGE, PACKAGE HAVING A LID-SPOUT ASSEMBLY AND METHOD FOR MOLDING A LID-SPOUT ASSEMBLY

(71) Applicant: Tetra Laval Holdings & Finance S.A., Pully (CH)

(72) Inventors: Daniele Palladino, Scandiano (IT); Maurizio Filippini, Modena (IT)

(73) Assignee: Tetra Laval Holdings & Finance S.A., Pully (CH)

( * ) Notice: Subject to any disclaimer, the term of this patent is extended or adjusted under 35 U.S.C. 154(b) by 24 days.

This patent is subject to a terminal disclaimer.

(21) Appl. No.: 17/923,582

(22) PCT Filed: May 21, 2021

(86) PCT No.: PCT/EP2021/063625
§ 371 (c)(1),
(2) Date: Nov. 6, 2022

(87) PCT Pub. No.: WO2021/239610
PCT Pub. Date: Dec. 2, 2021

(65) Prior Publication Data
US 2023/0182953 A1    Jun. 15, 2023

(30) Foreign Application Priority Data
May 27, 2020    (EP) .................................... 20176809

(51) Int. Cl.
*B65D 5/74* (2006.01)
*B29C 45/14* (2006.01)
(Continued)

(52) U.S. Cl.
CPC .............. *B65D 5/746* (2013.01); *B29C 45/14* (2013.01); *B65D 35/42* (2013.01); *B65D 43/24* (2013.01);
(Continued)

(58) Field of Classification Search
CPC ........ B65D 5/746; B65D 35/42; B65D 43/24; B65D 47/141; B65D 55/16; B65D 2251/1008; B29C 45/14; B29L 2031/712
See application file for complete search history.

(56) References Cited

U.S. PATENT DOCUMENTS 1,429,630 A * 9/1922 Rebideau ............... B65D 55/16
  220/744
4,356,924 A * 11/1982 Walter .................. B65D 47/141
  215/237

(Continued)

FOREIGN PATENT DOCUMENTS

EP    3590856 A1    1/2020
EP    3590857 A1    1/2020
(Continued)

OTHER PUBLICATIONS

Translation of KR-20020075761-A. (Year: 2024).*
International Search Report mailed Aug. 19, 2021, for priority International Patent Application No. PCT/EP2021/063625.

*Primary Examiner* — James N Smalley
(74) *Attorney, Agent, or Firm* — Renner, Otto, Boisselle & Sklar, LLP

(57) ABSTRACT

A lid-spout assembly for a package having a main body including a designated pour opening. The lid-spout assembly includes at least a spout having a pouring outlet, a lid configured to selectively close and open the pouring outlet and being controllable between at least a closed position and an open position, a tethering element tethering the lid to the spout, a retaining group configured to interact with the
(Continued)

tethering element and/or the lid for retaining the lid in the open position. The retaining group includes at least a support portion being configured to be positioned within the main body and an interaction portion being configured to interact with the tethering element and/or the lid for retaining the lid in the open position and connected to the support portion and being configured to extend away from the main body.

12 Claims, 3 Drawing Sheets

(51) Int. Cl.
| | |
|---|---|
| *B29L 31/00* | (2006.01) |
| *B65D 35/42* | (2006.01) |
| *B65D 43/24* | (2006.01) |
| *B65D 47/14* | (2006.01) |
| *B65D 55/16* | (2006.01) |

(52) U.S. Cl.
CPC ............ *B65D 47/141* (2013.01); *B65D 55/16* (2013.01); *B29L 2031/712* (2013.01); *B65D 2251/1008* (2013.01)

(56) References Cited

U.S. PATENT DOCUMENTS

| | | | | |
|---|---|---|---|---|
| 4,516,689 A | * | 5/1985 | Barker | ................ B65D 17/506 |
| | | | | 220/269 |
| 4,949,865 A | * | 8/1990 | Turner | ............... B65D 47/0847 |
| | | | | 220/837 |
| 2014/0020341 A1 | * | 1/2014 | Coburn | ................. G01F 19/002 |
| | | | | 220/832 |

FOREIGN PATENT DOCUMENTS

| | | | | |
|---|---|---|---|---|
| JP | 2006335458 A | * | 12/2006 | |
| KR | 20020075761 A | * | 10/2002 | ............. B65D 33/38 |
| KR | 20030023685 A | | 3/2003 | |
| WO | 2011073105 A1 | | 6/2011 | |

* cited by examiner

LID-SPOUT ASSEMBLY FOR A PACKAGE, PACKAGE HAVING A LID-SPOUT ASSEMBLY AND METHOD FOR MOLDING A LID-SPOUT ASSEMBLY

TECHNICAL FIELD

The present invention relates to a lid-spout assembly for a package, in particular a package having a sealed main body, filled with a pourable product, even more particular filled with a pourable food product.

Advantageously, the present invention also relates to a package, in particular a package having a sealed main body, filled with a pourable product, even more particular filled with a pourable food product, and comprising a lid-spout assembly.

Advantageously, the present invention also relates to a method for molding a lid-spout assembly to a packaging material, in particular a packaging material for forming a package having a sealed main body, filled with a pourable product, even more particular filled with a pourable food product.

BACKGROUND ART

As is known, many liquid or pourable food products, such as fruit juice, UHT (ultra-high-temperature treated) milk, wine, tomato sauce, etc., are sold in packages, in particular sealed packages, made of sterilized packaging material.

A typical example is the parallelepiped-shaped package for pourable food products known as Tetra Brik Aseptic (registered trademark), which is made by sealing and folding a laminated strip packaging material. The packaging material has a multilayer structure comprising a carton and/or paper base layer, covered on both sides with layers of heat-seal plastic material, e.g. polyethylene. In the case of aseptic packages for long-storage products, the packaging material also comprises a layer of oxygen-barrier material, e.g. an aluminum foil, which is superimposed on a layer of heat-seal plastic material, and is in turn covered with another layer of heat-seal plastic material forming the inner face of the package eventually contacting the food product.

Some of the known packages are designed for the consumption on-the-go, i.e. the package is provided with means which allow a consumer to consume the pourable product without the need to pour the pourable product into another container such as a drinking glass or a drinking cup prior to its consumption.

One of the known means may be a straw, which is to be introduced into a main body of the package, the main body containing the pourable product. Prior to its use, the straw is wrapped within an envelope, which typically is attached together with the straw to the main body. Thus, prior to a first-time use, the straw has to be extracted from the envelope. A drawback of such packages is seen in that the presence of a straw and its envelope may lead to an unwanted or undesired littering of the envelope and/or the straw.

Alternative solutions are described in the European patent applications EP-A-3590856 and EP-A-3590857 by the same Applicant. Both European patent applications describe respective packages resolving the inconveniences related to the packages being provided with straws and their envelopes. Each one of the packages disclosed in the above-mentioned European patent applications comprises a sealed main body having a designated pour opening and a lid-spout assembly arranged on the main body about the designated pour opening and configured to allow for a controlled outpouring of the pourable product so that the consumer can consume the pourable product directly from the package.

Each lid-spout assembly comprises a spout having a pouring outlet and a lid removably coupled to the spout so as to selectively close and open the pouring outlet.

The spout comprises a base frame for coupling the spout to the main body about the designated pour opening and a collar carrying the pouring outlet and protruding from the base frame.

In order to avoid any unwanted littering of the lid, the lid-spout assembly also comprises a tethering element connecting the lid and the spout with one another. In particular, the tethering element is fixed to the lid and the base frame.

The lid-spout assembly also comprises a retaining group connected to the base frame and fused to an outer surface of the main body. The retaining group allows to retain the lid in a defined position, when a user consumes the pourable product.

Even though such latter lid-spout assemblies work satisfyingly well, a desire is felt in the sector to further improve such lid-spout assemblies.

DISCLOSURE OF INVENTION

It is therefore an object of the present invention to provide in a straightforward and low-cost manner an improved lid-spout assembly for a package, in particular a package having a sealed main body, filled with a pourable product, even more particular filled with a pourable food product.

In particular, it is an object of the present invention to provide in a straightforward and low-cost manner an improved lid-spout assembly for a package, in particular a package having a sealed main body, filled with a pourable product, even more particular filled with a pourable food product, which ensures a permanent coupling of the retaining group to the main body and/or coming along with a facilitated molding of the lid-spout assembly.

It is a further object of the present invention to provide in a straightforward and low-cost manner a package, in particular a package having a sealed main body, filled with a pourable product, in particular filled with a pourable food product, having a lid-spout assembly, in particular the lid-spout assembly being designed to ensure a permanent coupling of the retaining group to the main body of the package and/or coming along with a facilitated molding of the lid-spout assembly.

It is an even further object of the present invention to provide a method for coupling a lid-spout assembly to a packaging material.

BRIEF DESCRIPTION OF THE DRAWINGS

A non-limiting embodiment of the present invention will be described by way of example with reference to the accompanying drawings, in which.

BEST MODES FOR CARRYING OUT THE INVENTION

Figure 1:
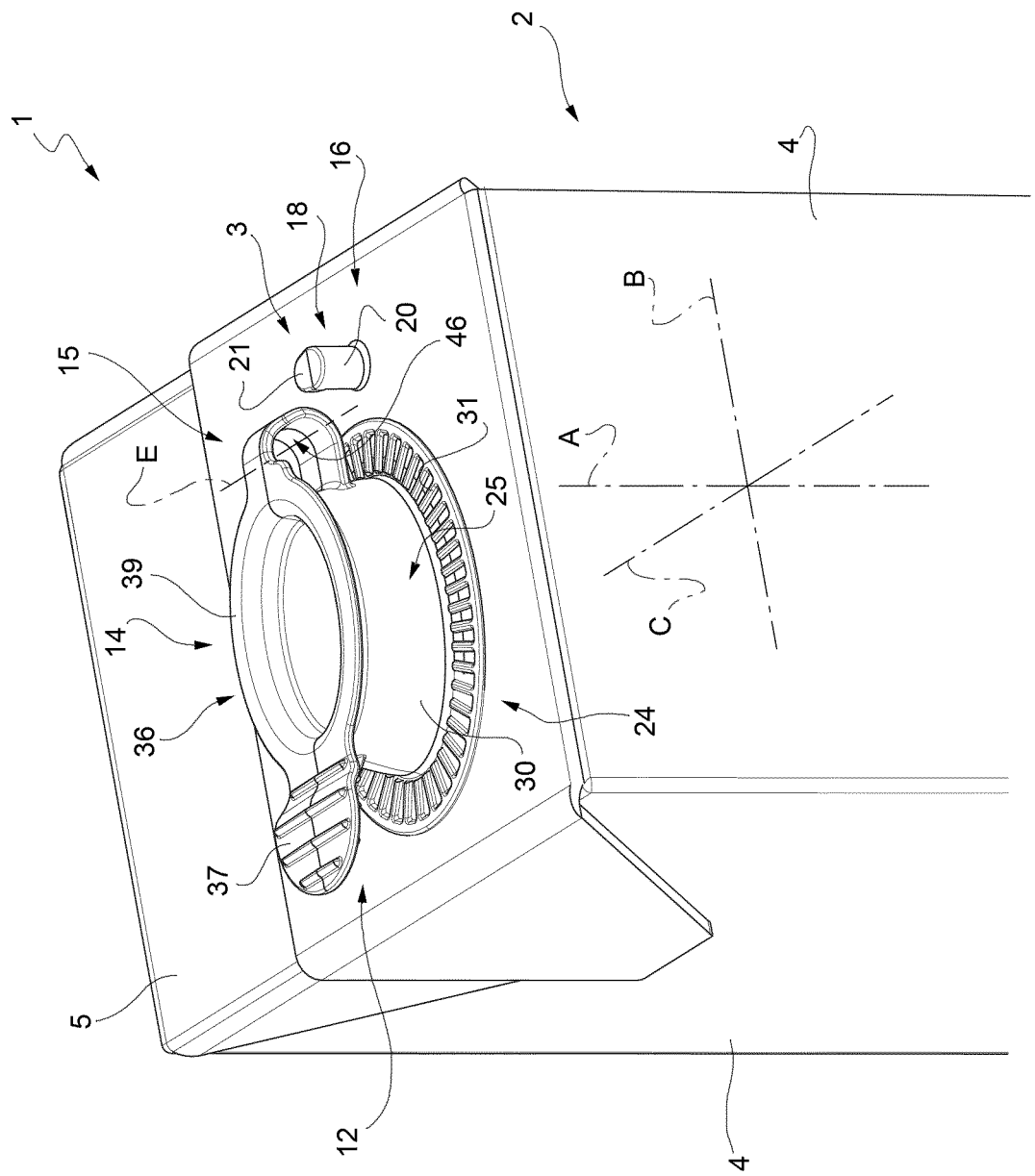
FIG. 1 is a schematic perspective view of a portion of a package having a lid-spout assembly according to the present invention, with parts removed for clarity.

Number 1 indicates as a whole a package comprising:
a (sealed) main body 2, in particular a sealed carton body, being filled with a pourable product, in particular a pourable food product, and having a designated pour opening (not shown and known as such) configured to allow for an outflow of the pourable product from main body 2; and
a lid-spout assembly 3 coupled to main body 2 arranged and/or arrangeable about the designated pour opening and configured to allow for a controlled outpouring of the pourable product from main body 2, in particular so that a consumer can consume the pourable product directly through lid-spout assembly 3 and/or from package 1.

Preferentially, package 1 is designed for the consumption on-the-go, i.e. the consumer can consume the pourable product directly from package 1 without the need of any intermediate means such as drinking glasses, drinking cups or similar.

Preferentially, lid-spout assembly 3 is designed for the consumption on-the-go, i.e. the consumer can consume the pourable product directly through lid-spout assembly 3.

According to some preferred non-limiting embodiments, main body 2 is obtained from a packaging material, in particular a composite packaging material, having a multi-layer structure (not shown and known as such).

Preferentially, the packaging material is provided in the form of a web and/or a sheet.

Preferentially, main body 2 is obtained by forming a tube from the packaging material, longitudinally sealing the tube, filling the tube with the pourable product and by transversally sealing and cutting the tube. In some instances, the packaging material is sterilized prior to forming, longitudinally sealing, filling and transversally sealing and cutting the tube.

Preferentially, the packaging material comprises at least one layer of fibrous material, such as e.g. paper or cardboard, and at least two layers of heat-seal plastic material, e.g. polyethylene, interposing the layer of fibrous material in between one another. One of these two layers of heat-seal plastic material defining the inner face of main body 2 contacting the pourable product.

Preferably, the packaging material also comprises a layer of gas- and light-barrier material, e.g. aluminum foil or ethylene vinyl alcohol (EVOH) film, in particular being arranged between one of the layers of the heat-seal plastic material and the layer of fibrous material. Preferentially, the packaging material also comprises a further layer of heat-seal plastic material being interposed between the layer of gas- and light-barrier material and the layer of fibrous material.

According to some non-limiting embodiments, lid-spout assembly(ies) 3 is/are applied to the packaging material prior to arranging the packaging material within or during advancement of the packaging material through a packaging machine for forming, filling and sealing main body(ies) 2 from the packaging material carrying lid-spout assembly(ies) 3.

Alternatively, lid-spout assembly(ies) 3 is/are applied to the packaging material during the formation of main body(ies) 2 from the packaging material.

In particular, application of lid-spout assembly(ies) 3 to the packaging material occurs by means of a molding process and/or adhesive bonding and/or ultrasonic bonding.

Preferentially, lid-spout assembly(ies) 3 are molded to the packaging material according to a method, which is described further below.

With particular reference to FIG. 1, main body 2 extends along a longitudinal axis A, a first transversal axis B and a second transversal axis C. In particular, the extension of package 2 along longitudinal axis A is larger than the extension of package 2 along first transversal axis B and second transversal axis C.

Preferentially, main body 2 is parallelepiped-shaped.

According to some preferred non-limiting embodiments, main body 2 comprises a first wall portion (not shown and known as such), in particular being transversal, even more particular perpendicular, to longitudinal axis A, from which main body 2 extends along longitudinal axis A. Preferably, the first wall portion defines a support surface of package 1, in particular of main body 2, which is designed to be put in contact with a support, such as e.g. a shelf, when, in use, being e.g. exposed within a sales point or when being stored. In particular, when being arranged on a support the first wall portion defines a bottom wall portion.

Preferably, main body 2 also comprises a plurality of lateral walls 4 being (fixedly) connected to the first wall portion and extending, in particular substantially parallel to longitudinal axis A, from the first wall portion.

Preferably, main body 2 also comprises a second wall portion 5 opposite to the first wall portion and being (fixedly) connected to at least some of lateral walls 4. In particular, lateral walls 4 are interposed between the first wall portion and second wall portion 5. In particular, when main body 2 is arranged on a support second wall portion 5 defines a top wall portion.

According to some non-limiting embodiments, the first wall portion and second wall portion 5 may be parallel to one another.

According to a non-limiting alternative embodiment not shown, the first wall portion and second wall portion 5 could be inclined with respect to one another.

According to some non-limiting embodiments, second wall portion 5 carries and/or comprises the designated pour opening.

According to some alternative non-limiting embodiments, one of lateral walls 4 could carry and/or comprise the designated pour opening.

Figure 2:
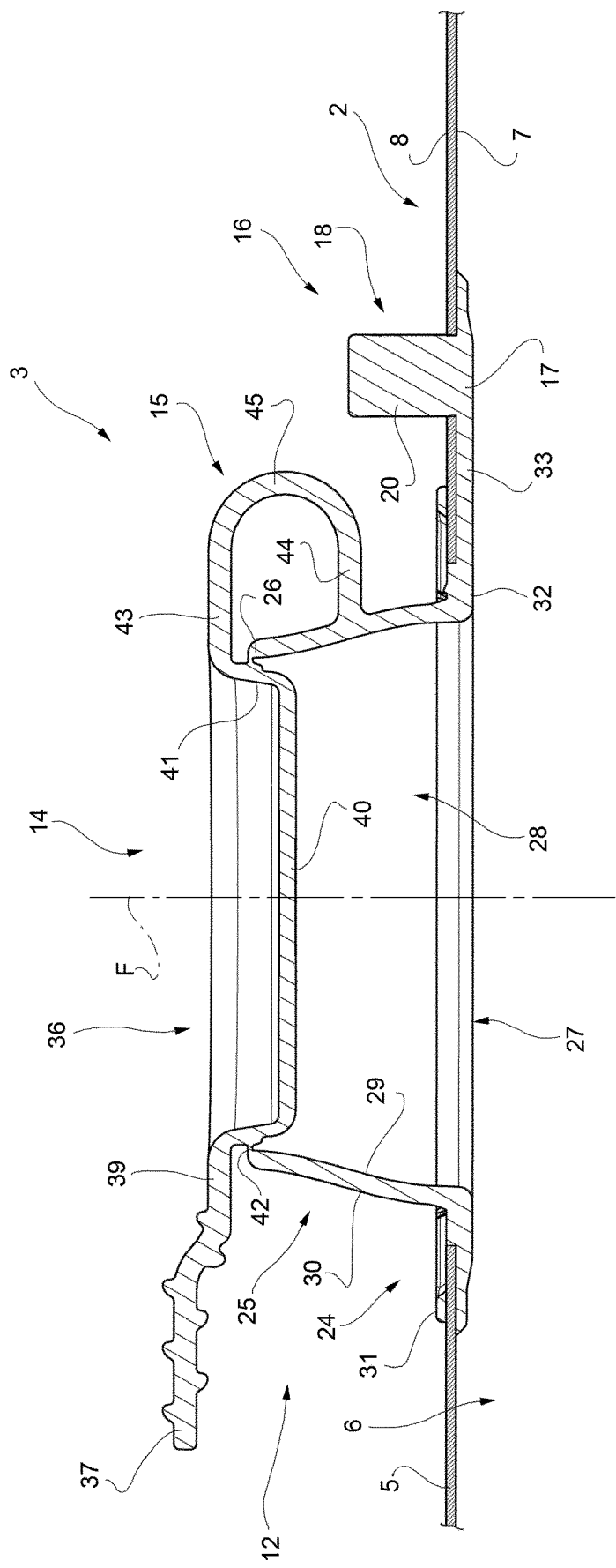
FIG. 2 is an enlarged sectioned side-view of details of the package of FIG. 1 with the lid-spout assembly being in a first configuration, with parts removed for clarity.
Figure 3:
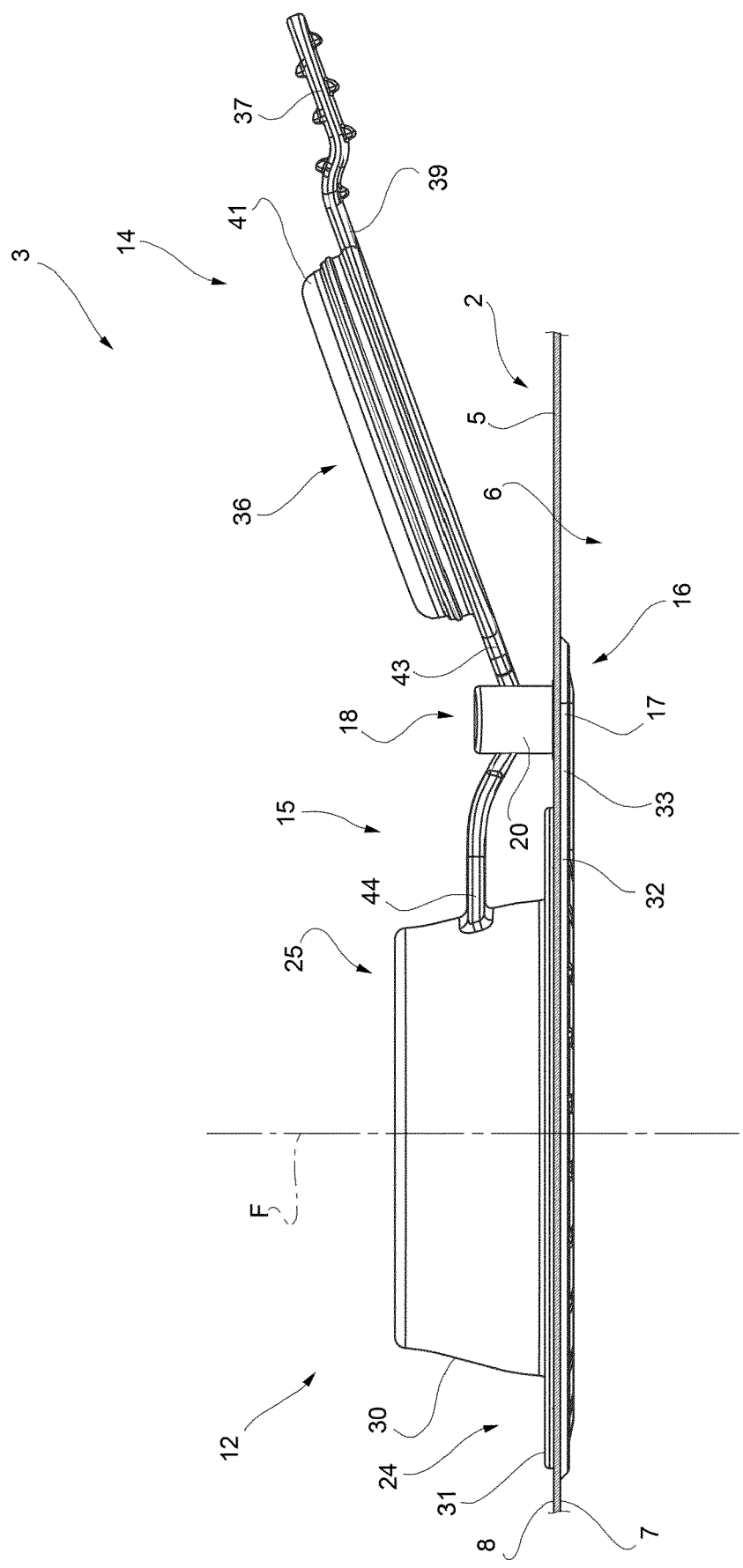
FIG. 3 is an enlarged side-view of the lid-spout assembly being in a second configuration, with parts removed for clarity.

According to some preferred non-limiting embodiments, and with particular reference to FIGS. 2 and 3, package 1, in particular main body 2, comprises an inner space 6 configured to contain and/or containing the pourable product. In particular, at least the first wall portion, lateral walls 4 and second wall portion 5 delimit inner space 6.

With particular reference to FIGS. 2 and 3, main body 2 comprises an inner surface 7 facing inner space 6 and an outer surface 8 opposite to inner surface 7. In particular, the pourable product contacts inner surface 7.

With particular reference to FIGS. 1 to 3, lid-spout assembly 3 comprises at least:
a spout 12 being connected or being connectable to main body 2 about the designated pour opening and having a pouring outlet configured to allow for a (controlled) outflow of the pourable product from spout 12 itself (and main body 2 and/or package 1);
a lid 14 coupled to spout 12, configured to selectively close and open the pouring outlet and being controllable between at least a closed position (see FIGS. 1 and 2) in which lid 14 is configured to cover and/or covers the pouring outlet, in particular for impeding an outflow of the pourable product out of the pouring outlet, and an open position (see FIG. 3) in which lid 14 is configured to be and/or is detached from the pouring outlet, in particular for allowing an outflow of the pourable product through the pouring outlet;

a tethering element 15 (permanently) tethering and/or coupling lid 14 to spout 12; and a retaining group 16 configured to interact with tethering element 15 and/or lid 14 for retaining lid 14 in the open position.

Advantageously, retaining group 16 comprises at least:

a support portion 17 being designed to be and/or being positioned (and to extend) within (inner space 6 of) main body 2 and an interaction portion 18 configured to interact with tethering element 15 and/or lid 14 for (at least temporarily) retaining lid 14 in the open position and connected to support portion 17 and being designed to extend away from main body 2 (and support portion 17).

Preferentially, retaining group 16 is configured to temporarily retain lid 14 in the open position so that lid 14 and/or tethering element 15 can be disengaged from retaining group 16 again, therewith allowing lid 14 to be repeatedly controlled between the closed position and the open position.

According to the embodiment disclosed, tethering element 15 is designed to be (temporarily) coupled to retaining group 16 for retaining lid 14 in the open position.

Advantageously, main body 2 comprises an auxiliary through hole distinct and spaced apart from the designated pour opening. In particular, interaction portion 18 is designed to protrude from support portion 17 and through the auxiliary through hole.

In particular, by having support portion 17 being arranged within inner space 6 and interaction portion 18 protruding away from support portion 17 and main body 2, it is guaranteed that retaining group 16 cannot be separated from main body 2.

Preferentially, support portion 17 is designed to be and/or is connected to, in particular fused and/or bonded, to main body 2, in particular inner surface 7, preferably about the auxiliary through hole. In particular, support portion 17 has an engagement surface being fused and/or bonded to inner surface 7. Even more particular, support portion 17 comprises a second surface opposite to the engagement surface and being configured to face, with lid-spout assembly 3 being coupled to main body 2, inner space 6 (in other words, the pourable product may contact or contacts the second surface).

Preferentially, support portion 17 comprises a support plate carrying interaction portion 18 and/or has a plate-like shape.

According to some preferred non-limiting embodiments, interaction portion 18 comprises a hook element configured to interact with tethering element 15 and/or lid 14, in particular with tethering element 15, for retaining lid 14 in the open position.

Preferentially, the hook element transversally, in particular perpendicularly, extends from support portion 17 and through the auxiliary through hole.

In particular, the hook element comprises a support bar 20 being fixed to and transversally, in particular perpendicularly, protruding from support portion 17 and through the auxiliary through hole and a hook 21 transversally protruding from support bar 20. Even more particular, hook 21 is connected to a first terminal portion of support bar 20 opposite to a second terminal portion of support bar 20 being connected to support portion 17.

With particular reference to FIGS. 1 to 3, lid 14 is configured to close and open the pouring outlet when being respectively in the closed position and the open position.

Preferentially, lid 14 is in a first angular position and in a second angular position with respect to a hinge axis E when being controlled in respectively the closed position and the open position. In particular, tethering element 15 defines hinge axis E.

It should be noted that package 1 is immediately after its formation in an initial configuration in which lid 14 is in the closed position. Package 1 is distributed and/or sold to a consumer while being in the initial configuration.

In more detail and with particular reference to FIGS. 1 to 3, spout 12 comprises at least:

a base frame 24 coupling and/or configured to couple spout 12 to main body 2, in particular to second wall portion 5, about the designated pour opening; and a collar 25 carrying (comprising) the pouring outlet and being fixed to base frame 24 and protruding from base frame 24.

Preferentially, collar 25 extends along a longitudinal axis F, in particular transversal, even more particular perpendicular to second wall portion 5, and carries (comprises) the pouring outlet at a first axial end of collar 25 itself, and in particular an inlet opening 27 for the pourable product at a second axial end of collar 25 itself opposite to the first axial end.

Preferentially, collar 25 delimits (and/or comprises) a flow channel 28 for the pourable product, in particular extending between inlet opening 27 and the pouring outlet. In use, collar 25 is configured such to receive the pourable product from inner space 6 through inlet opening 27 and such that the pourable product flows out of the pouring outlet.

Preferentially, collar 25 comprises an inner surface 29 delimiting flow channel 28 and an outer surface 30 opposite to inner surface 29.

Preferentially, collar 25 has a tubular configuration.

Preferentially, collar 25 has an annular cross-sectional profile with respect to a cross-sectional plane perpendicular to longitudinal axis F. In particular, the cross-sectional profile has an oval shape. Alternatively, the cross-sectional profile could have a circular or square or elliptical or rectangular shape.

Preferentially, collar 25 comprises a first rim 26 delimiting the pouring outlet, and in particular a second rim opposite to first rim 26 and delimiting inlet opening 27. In particular, first rim 26 is arranged at the first axial end of collar 25 and the second rim is arranged at the second axial end of collar 25.

In particular, first rim 26, even more particular also the second rim, has/have a respective oval shape. Alternatively, first rim 26 and/or the second rim could have a square and/or a rectangular and/or an elliptical and/or circular shape.

According to some preferred non-limiting embodiments, collar 25, in particular first rim 26, is designed such to allow a consumer to drink from spout 12, in particular collar 25.

Preferentially, collar 25 is shaped such to facilitate the outflow of the pourable product from collar 25 itself.

Advantageously, base frame 24 is connected, in particular fused or bonded, to inner surface 7 and outer surface 8, in particular about the designated pour opening.

Preferentially, base frame 24 comprises a first annular portion 31 and a second annular portion 32, in particular axially displaced from one another with respect to longitudinal axis F, and configured to interpose and/or interposing a portion of main body 2, in particular second wall portion 5, between one another. In particular, the portion of main body 2, in particular second wall portion 5, is at the designated pour opening. Even more particular, first annular portion 31 and second annular portion 32 define an annular space for the portion of main body 2.

Even more preferentially, first annular portion 31 and second annular portion 32 are configured to be and/or are fused to respectively outer surface 8 and inner surface 7.

Preferentially, first annular portion 31 comprises a first engagement surface and second annular portion 32 comprises a second engagement surface. The first engagement surface and the second engagement surface being configured to be fused and/or being fused to respectively outer surface 8 and inner surface 7.

With particular reference to FIGS. 1 and 2, retaining group 16, in particular support portion 17, is connected, in particular fixed, to spout 12, in particular base frame 24, even more particular second annular portion 32.

Preferentially, support portion 17 is (substantially) parallel to base frame 24, in particular second annular portion 32, even more particular the second engagement surface.

According to some preferred non-limiting embodiments, lid spout-assembly 3 further comprises a connection base 33 fixing retaining group 16 to spout 12.

In particular, connection base 33 is fixed to base frame 24 and support portion 17, even more particular connection base 33 is fixed to second annular portion 32 and support portion 17.

Preferentially, connection base 33 laterally protrudes from base frame 24, in particular second annular portion 32.

According to some preferred non-limiting embodiments, support portion 17 is connected to and laterally protrudes from connection base 33.

According to some preferred non-limiting embodiments, support portion 17 is (substantially) parallel to connection base 33 and/or second annular portion 32.

With particular reference to FIGS. 1 to 3, lid 14 comprises at least a main portion 36 configured to at least partially protrude and/or at least partially protruding into flow channel 28, and in particular to seal the pouring outlet, in particular with lid 14 being arranged in the closed position.

Preferentially, main portion 36 is shaped like a hat or is hat-like shaped.

Preferentially, lid 14 also comprises a gripping element 37 protruding, in particular laterally protruding, from main portion 36, and in particular being configured to allow the consumer to grip gripping element 37 itself so that the consumer can control lid 14 between the closed position and the open position. In particular, gripping element 37 comprises ribs improving the gripping properties of gripping element 37.

According to some preferred non-limiting embodiments, main portion 36 comprises at least:
- a central section at least partially protruding and/or configured to at least partially protrude into flow channel 28, in particular with lid 14 being in the closed position; and
- a peripheral section 39 connected to and surrounding the central section and configured to engage and/or engaging collar 25, in particular first rim 26.

Preferentially, the central section comprises at least:
- a central wall 40, in particular transversal, even more particular perpendicular, to longitudinal axis F with lid 14 being in the closed position; and
- a lateral wall 41 fixed to and protruding from central wall 40, and in particular configured to engage inner surface 29 with lid 14 being in the closed position.

In particular, lateral wall 41 is fixed to central wall 40 at a first end of lateral wall 41 itself and to peripheral section 39 at a second end of lateral wall 41 itself.

According to some preferred non-limiting embodiments, central wall 40 is arranged within flow channel 28, in particular between the pouring outlet and inlet opening 27, with lid 14 being arranged in the closed configuration.

According to some preferred non-limiting embodiments, lid 14 is rupturably fixed to collar 25, in particular first rim 26, in particular prior to the first time lid 14 is controlled from the closed position to the open position. In particular, lid 14, preferentially main portion 36, even more particular the central section and/or peripheral section 39, is rupturably fixed in an irreversible manner to collar 25, in particular first rim 26. Thus, after the first-time control of lid 14 from the closed position to the open position, it is again possible to control lid 14 in the closed position and to establish contact between lid 14 and collar 25, but lid 14 is not fixed to collar 12 anymore.

Preferentially, lid-spout assembly 3 also comprises a coupling membrane 42, in particular an annular coupling membrane 42, rupturably connecting lid 14 and collar 25 to one another, in particular prior to the first time lid 14 is controlled from the closed position to the open position.

According to some non-limiting embodiments, lid 14 comprises coupling membrane 42.

According to alternative non-limiting embodiments, collar 25 comprises coupling membrane 42.

According to alternative non-limiting embodiments, lid 14 and collar 25 each comprises a respective portion of coupling membrane 42.

In particular, lid 14 is rupturably fixed to collar 25, in particular by means of coupling membrane 42, so as to seal flow channel 28 (and as a consequence inner space 6) from an outer environment.

According to some preferred non-limiting embodiments, lid 14 is bonded and/or welded and/or molded to collar 25 so as to rupturably fix lid 14 to collar 25.

With particular reference to FIGS. 1 to 3, tethering element 15 comprises a first end 43 fixed to lid 14 and a second end 44, in particular opposite to first end 43, fixed to collar 25.

Preferentially, tethering element 15 is fixed to outer surface 30.

According to some preferred non-limiting embodiments, first end 43 is connected to main portion 36, in particular peripheral section 39. In particular, first end 43 is connected to a first zone of main portion 36, in particular peripheral section 39, and gripping element 37 is connected to a second zone of main portion 36, in particular peripheral section 39. Preferentially, the first zone is opposite to the second zone.

According to some preferred non-limiting embodiments, tethering element 15 is bendable and/or flexible and/or deflectable.

Preferentially, tethering element 15 is configured to modify its shape in dependence of the position of lid 14.

Preferentially, tethering element 15 is controllable between at least a first configuration with lid 14 being in the closed position and a second configuration (distinct from the first configuration) with lid 14 being in the open configuration.

According to some preferred non-limiting embodiments, tethering element 15 comprises a bendable portion 45 configured to modify its shape in dependence of the position of lid 14. In particular, bendable portion 45 is configured to modify its shape during control of lid 14 between the closed position and the open position (and accordingly of tethering element 15 between the first configuration and the second configuration).

According to some preferred non-limiting embodiments, tethering element 15, in particular bendable portion 45, presents a curved shape, in particular a curved U-shape, when being in the first configuration and/or with lid 14 being in the closed configuration.

Preferentially, tethering element 15 presents a S-shape with lid 14 being in the open configuration (and in particular with lid 14 and/or tethering element 15 interacting with retaining group 16).

According to some preferred non-limiting embodiments, tethering element 15 comprises a recess 46 configured to engage retaining group 33, in particular hook element 35, so as to (at least) temporarily fix lid 12 in the open position.

In particular, recess 46 is designed such that tethering element 15 engages a portion of support bar 20 and a portion of hook 21 for retaining lid 14 in the open configuration.

Preferentially, recess 46 is delimited by a main surface and two auxiliary surfaces spaced apart from one another and being transversal, in particular perpendicular, to main surface. In particular, auxiliary surfaces are designed such to interpose a portion of support bar 20 between one another with tethering element 15 being coupled to retaining group 16.

Preferentially, the hook element, in particular hook 21, comprises an abutment surface, in particular facing main body 2, in particular second wall portion 5, and tethering element 15 is configured to abut against the abutment surface when being coupled to retaining group 16.

According to some preferred non-limiting embodiments, lid-spout assembly 3, in particular spout 12, lid 14, tethering element 15 and retaining group 16, is/are formed in a single piece.

According to some preferred non-limiting embodiments, lid-spout assembly 3, in particular spout 12, lid 14, tethering element 15 and retaining group 16, is/are formed and/or molded, in particular simultaneously molded, from a polymer and preferentially in a single piece.

In particular, lid-spout assembly 3 is directly molded on the packaging material according to the following method.

Preferentially, lid-spout assembly 3 is molded on the packaging material being provided as a sheet. Alternatively, lid-spout assembly 3 could be molded onto the packaging material with the packaging material defining a precursor of main body 2 (in other word, lid-spout assembly 3 could be molded onto the partially formed main body 2).

Advantageously, the method comprises at least
  providing the packaging material having at least a main through hole, which will form the designated pour opening, and an auxiliary through hole distinct and spaced apart from the main through hole and which will form the auxiliary through hole of main body 2;
  coupling a molding tool to the packaging material such that the molding tool defines and/or comprises at least a first cavity at the main through hole and a second cavity at the auxiliary through hole; wherein the first cavity is formed such to allow the formation of at least spout 12 and the second cavity is formed such to allow the formation of at least retaining group 16; and
  injecting a molten polymer material at least into the first cavity and into the second cavity for forming at least spout 12 and the retaining group 16.

Preferentially, the first cavity is formed such to also allow the formation of lid 14 and tethering element 15, in particular also coupling membrane 42, so that during the step of injecting the molten polymer material also lid 14 and tethering element 15, in particular also coupling membrane 42, are formed.

Preferentially, during the step of injecting the molten polymer material, spout 12, in particular base frame 24, is fused to a first surface and a second surface opposite to the first surface of the packaging material and support portion 17 is fused to the second surface. In particular, the first surface defines outer surface 8 and the second surface defines inner surface 7 of the finally formed main body 2.

Preferentially, the second cavity is formed such that interaction portion 18 protrudes from support portion 17 and through the auxiliary through hole.

According to some preferred non-limiting embodiments, the mold tool is also designed such to comprise and/or define a connection channel between the first cavity and the second cavity so that during the step of injecting the molten polymer material, the molten polymer is also injected into the connection channel for connecting spout 12 with retaining group 16. In particular, the connection channel is designed such to allow the formation of connection base 33.

Preferentially, the connection channel is in fluidic connection with the first cavity and the second cavity.

In particular, during the step of injecting, the molten polymer is injected into the first cavity and flows through the connection channel into the second cavity.

According to some preferred non-limiting embodiments, the method also comprises a step of setting during which the injected polymer material sets and a step of disengaging the mold tool from the packaging material executed after the step of setting.

According to some preferred non-limiting embodiments, the step of providing, comprises the sub-step of punching, during which the main through hole and the auxiliary through hole are punched through the packaging material.

According to some preferred embodiments, once lid-spout assembly 3 has been molded to the packaging material, main body 2 is formed from the packaging material. In particular, the packaging material is formed into a tube, longitudinally sealed. Subsequently the following operations are performed: transversally sealing the tube for obtaining a first transversal seal, filling the pourable product into the semi-formed main body 2 and finally executing a further transversal sealing, so as to obtain a second transversal seal.

According to some possible non-limiting embodiments, the packaging material is sterilized prior to the formation of the tube.

In use, the outpouring of the pourable product from package 1 requires controlling lid 14 from the closed position to the open position so as to open the pouring outlet.

The first time lid 14 is controlled from the closed position to the open position, lid 14 is detached from collar 25 so that the next time lid 14 is again arranged in the closed position, lid 14 is only connected to collar 25, but not fixed.

When lid 14 is controlled in the open position, tethering element 15 is coupled to retaining group 16 so that lid 14 remains in the open position.

After the termination of the outpouring, lid 14 is newly positioned in the closed position.

The advantages of lid-spout assembly 3 and/or of package 1 according to the present invention will be clear from the foregoing description.

In particular, as support portion 17 is configured to sit within main body 2 and having interaction portion 18 protruding away from main body 2, it is ensured that retaining group 16 cannot detach from main body 2.

A further advantage resides in support portion 17 being fused to inner surface 7 about the auxiliary through hole so as to guarantee a sealing of main body 2 at the auxiliary through hole.

Another advantage is seen in that the molding of retaining group 33 is facilitated.

Clearly, changes may be made to lid-spout assembly 3 and/or package 1 as described herein without, however, departing from the scope of protection as defined in the accompanying claims.

The invention claimed is:

1. A lid-spout assembly for a package having a main body comprising a designated pour opening and being filled with a pourable product;
 the lid-spout assembly comprises at least:
  a spout having a pouring outlet and being arrangeable about the designated pour opening;
  a lid configured to selectively close and open the pouring outlet and being controllable between at least a closed position in which the lid is configured to cover the pouring outlet and an open position in which the lid is configured to open the pouring outlet;
  a tethering element tethering the lid to the spout; and
  a retaining group configured to interact with the tethering element and/or the lid for retaining the lid in the open position;
  wherein the retaining group comprises at least a support portion being configured to be positioned within the main body and an interaction portion being configured to interact with the tethering element and/or the lid for retaining the lid in the open position and connected to the support portion and being configured to extend away from the main body; and
  wherein the support portion is designed to contact an inner surface of the main body.

2. The lid-spout assembly according to claim 1, wherein the interaction portion is designed to protrude from the support portion and through an auxiliary through hole of the main body.

3. The lid-spout assembly according to claim 1, wherein the support portion is fixed to the spout.

4. The lid-spout assembly according to claim 1, wherein the spout comprises at least:
 a base frame configured to couple the spout to the main body about the designated pour opening;
 wherein the support portion is fixed to the base frame.

5. The lid-spout assembly according to claim 4, wherein the lid-spout assembly comprises a connection base fixing the support portion to the base frame.

6. The lid-spout assembly according to claim 5, wherein the base frame comprises a first annular portion and a second annular portion displaced from one another and configured to interpose a portion of the main body between one another;
 wherein the first annular portion is configured to be fused to an outer surface of the main body and the second annular portion is configured to be fused to an inner surface of the main body;
 wherein the support portion is connected to and laterally protrudes from the connection base and the connection base is connected to and laterally protrudes from the second annular portion.

7. The lid-spout assembly according to claim 1, wherein the interaction portion comprises a hook element transversally, in particular perpendicularly, protruding from the support portion, and configured to interact with the tethering element for retaining the lid in the open position.

8. The lid-spout assembly according to claim 1, wherein the spout, the lid the tethering element and the retaining group are formed in a single piece.

9. A package comprising a main body having a designated pour opening and being filled with a pourable product and at least one lid-spout assembly according to claim 1 and coupled to the main body.

10. The package according to claim 9, wherein the main body comprises an auxiliary through hole;
 wherein the interaction portion protrudes from the support portion and through the auxiliary through hole.

11. The package according to claim 9, wherein the main body is formed from a multilayer composite packaging material.

12. A lid-spout assembly for a package having a main body comprising a designated pour opening and being filled with a pourable product;
 the lid-spout assembly comprises at least:
  a spout having a pouring outlet and being arrangeable about the designated pour opening;
  a lid configured to selectively close and open the pouring outlet and being controllable between at least a closed position in which the lid is configured to cover the pouring outlet and an open position in which the lid is configured to open the pouring outlet;
  a tethering element tethering the lid to the spout; and
  a retaining group configured to interact with the tethering element and/or the lid for retaining the lid in the open position;
 wherein the retaining group comprises at least a support portion being configured to be positioned within the main body and an interaction portion being configured to interact with the tethering element and/or the lid for retaining the lid in the open position and connected to the support portion and being configured to extend away from the main body;
 wherein the spout comprises at least:
  a base frame configured to couple the spout to the main body about the designated pour opening;
  wherein the support portion is fixed to the base frame;
  wherein the lid-spout assembly comprises a connection base fixing the support portion to the base frame;
  wherein the base frame comprises a first annular portion and a second annular portion displaced from one another and configured to interpose a portion of the main body between one another;
  wherein the first annular portion is configured to be fused to an outer surface of the main body and the second annular portion is configured to be fused to an inner surface of the main body; and
  wherein the support portion is connected to and laterally protrudes from the connection base and the connection base is connected to and laterally protrudes from the second annular portion.

* * * * *